US011488020B2

(12) United States Patent
Reisswig et al.

(10) Patent No.: US 11,488,020 B2
(45) Date of Patent: Nov. 1, 2022

(54) ADAPTIVE HIGH-RESOLUTION DIGITAL IMAGE PROCESSING WITH NEURAL NETWORKS

(71) Applicant: SAP SE, Walldorf (DE)

(72) Inventors: Christian Reisswig, Berlin (DE); Shachar Klaiman, Heidelberg (DE)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 16/890,977

(22) Filed: Jun. 2, 2020

(65) Prior Publication Data

US 2021/0374548 A1 Dec. 2, 2021

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC ........ G06N 3/0454; G06N 3/08; G06N 20/00; G06N 3/084; G06V 10/82; G06V 20/698; G06V 10/757; G06V 10/993; G06V 20/695; G06V 10/454; G06V 10/50; G06V 10/75
See application file for complete search history.

(56) References Cited

U.S. PATENT DOCUMENTS

| 11,244,195 B2 * | 2/2022 | Pao ...................... G06K 9/6257 |
| 2018/0232887 A1 * | 8/2018 | Lin .......................... G06N 3/08 |
| 2019/0171876 A1 * | 6/2019 | Segalovitz ........... G06V 30/194 |
| 2020/0097778 A1 * | 3/2020 | Rozner ................... G06V 20/41 |
| 2020/0167586 A1 * | 5/2020 | Gao ...................... G06N 3/0454 |

FOREIGN PATENT DOCUMENTS

| CA | 3092994 A1 * | 9/2019 | ........... A61B 5/0033 |
| CN | 108573276 A * | 9/2018 | ........... G06K 9/3233 |
| CN | 110264536 A * | 9/2019 | ............... G06N 3/08 |
| CN | 113376182 A * | 9/2021 | ......... G06K 9/00771 |

(Continued)

OTHER PUBLICATIONS

A Full-Image Full-Resolution End-to-End-Trainable CNN Framework for Image Forgery Detection—2019 (Year: 2019).*

(Continued)

*Primary Examiner* — Nizar N Sivji
(74) *Attorney, Agent, or Firm* — Klarquist Sparkman, LLP

(57) ABSTRACT

Technologies are described for performing adaptive high-resolution digital image processing using neural networks. For example, a number of different regions can be defined representing portions of a digital image. One of the regions covers the entire digital image at a reduced resolution. The other regions cover less than the entire digital image at resolutions higher than the region covering the entire digital image. Neural networks are then used to process each of the regions. The neural networks share information using prolongation and restriction operations. Prolongation operations propagate activations from a neural network operating on a lower resolution region to context zones of a neural network operating on a higher resolution region. Restriction operations propagate activations from the neural network operating on the higher resolution region back to the neural network operating on the lower resolution region.

20 Claims, 6 Drawing Sheets

(56) References Cited

FOREIGN PATENT DOCUMENTS

WO    WO-2021133847 A1 *   7/2021
WO    WO-2021137946 A1 *   7/2021

OTHER PUBLICATIONS

Berger et al., "Adaptive Mesh Refinement for Hyperbolic Partial Differential Equations," *Journal of Computational Physics*, vol. 53, pp. 484-512, 1984.
Chen et al., "Drop an Octave: Reducing Spatial Redundancy in Convolutional Neural Networks with Octave Convolution," arXiv 1904.05049, 12 pages, Aug. 18, 2019.
Köpüklü et al., "Resource Efficient 3D Convolutional Neural Networks," arXiv 1904.02422v4, 10 pages, Sep. 9, 2019.
Lin et al., "Feature Pyramid Networks for Object Detection," arXiv 1612.03144, 10 pages, Apr. 19, 2017.

* cited by examiner

ADAPTIVE HIGH-RESOLUTION DIGITAL IMAGE PROCESSING WITH NEURAL NETWORKS

BACKGROUND

In various computer vision tasks, such as image classification, object detection, semantic segmentation, image captioning, visual question answering, and video understanding, an input image may be processed by a deep neural network. The input resolution of the image is a key factor in determining the memory requirements of the deep neural network during training and inference stages. In other words, the available computational memory determines the maximum input image resolution that can be processed. For example, depending on the width and depth of the neural network, the maximum possible input resolution may be limited (e.g., to below 1024×1024 pixels) even on state-of-the-art hardware, and even when using resource efficient neural networks.

Depending on the computer vision task being performed, the input image may need to be processed at different resolutions. For example, if the input image contains fine details that need to be analyzed, then the input image may need to be processed at a high resolution.

In some solutions, an input image is processed by a deep neural network by generating multiple resolutions of the entire input image. While such solutions can analyze small features, they have significant limitations. For example, each resolution of the entire image can require significant computing resources (e.g., memory, CPU, and/or time) to process, and it may not be possible or practical to process the entire image at higher resolutions.

Therefore, there exists ample opportunity for improvements in image processing technology using neural networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for performing adaptive high-resolution digital image processing using neural networks. For example, a number of different regions can be defined representing portions of a digital image. One of the regions covers the entire digital image at a reduced resolution. The other regions cover less than the entire digital image at resolutions higher than the region covering the entire digital image. Neural networks are then used to process each of the regions (e.g., one neural network operating on each region). The neural networks share information using prolongation and restriction operations. Prolongation operations propagate activations from a neural network operating on a lower resolution region to context zones of a neural network operating on a higher resolution region. Restriction operations propagate activations from the neural network operating on the higher resolution region back to the neural network operating on the lower resolution region.

For example, a process for adaptive high-resolution digital image processing using neural networks can comprise receiving a digital image, decomposing the digital image into a plurality of regions, performing a plurality of operations for a plurality of neural networks, and outputting results of the processing. The plurality of regions can comprise a first region that covers an entire area of the digital image, where the first region has a first resolution, and where the first resolution is a lower resolution representation of the digital image. The plurality of regions can also comprise one or more additional regions that cover less than the entire area of the digital image and that are contained within the first region, where the one or more additional regions have one or more additional resolutions that are higher than the first resolution. The plurality of neural networks can comprise a first neural network operating on the first region and at least a second neural network operating on the one the one or more additional regions. The operations for the plurality of neural networks can comprise prolongation operations that propagate activations from the first neural network onto context zones of the second neural network, where a context zone for a given region is outside of the given region, and restriction operations that propagate activations from the second neural network back to the first neural network.

DETAILED DESCRIPTION

Overview

Figure 1:
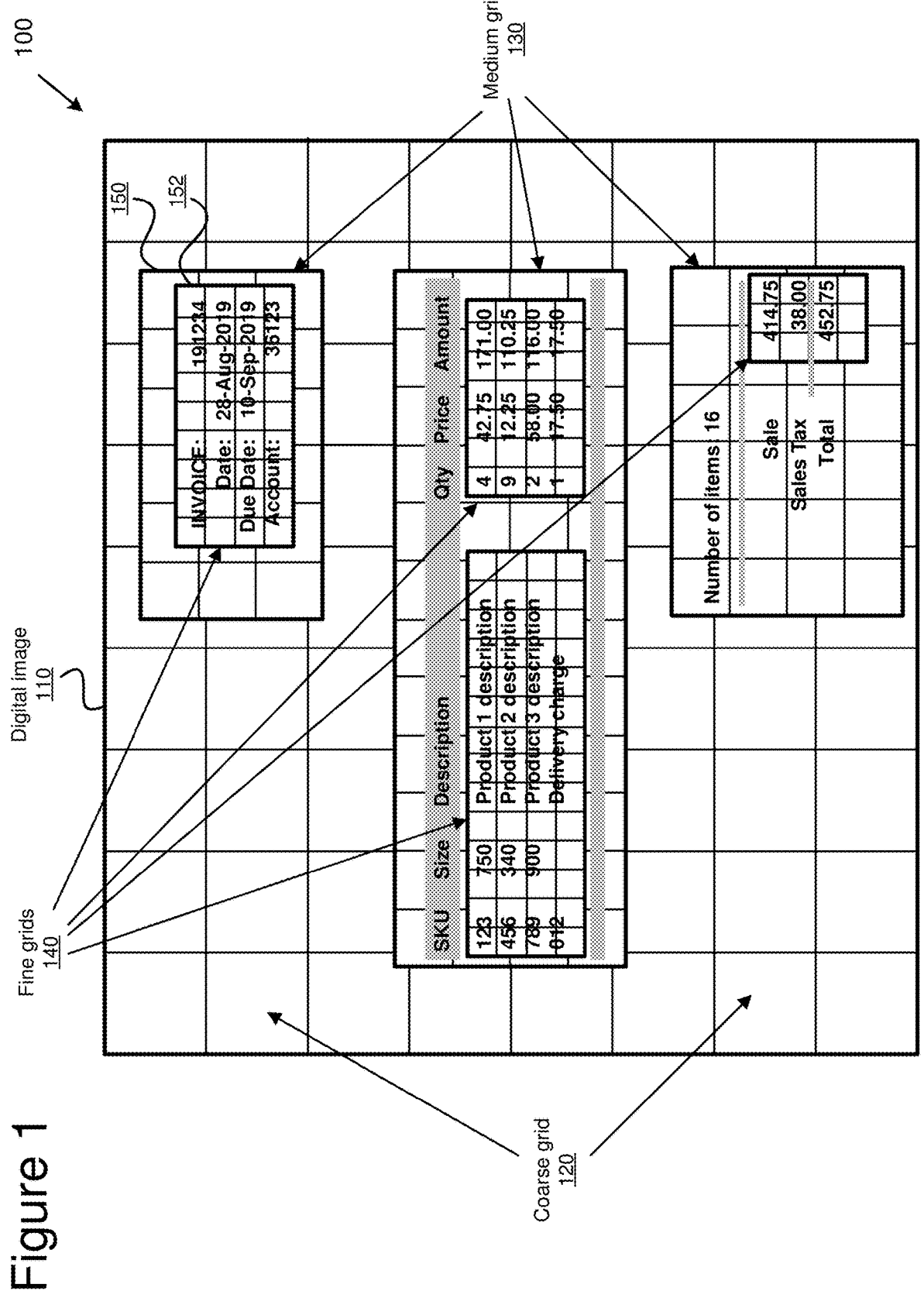
FIG. 1 is a diagram depicting an example decomposition of a digital image into overlapping regions having different resolutions.

The following description is directed to technologies for adaptive high-resolution digital image processing using neural networks. For example, a number of different regions can be defined representing portions of a digital image. One of the regions covers the entire digital image at a reduced resolution (e.g., comprising a lower resolution version of the digital image). The other regions cover less than the entire digital image at resolutions higher than the region covering the entire digital image. For example, the other regions cover areas of the digital image containing more detailed and/or more interesting image content (e.g., text content in a document image, faces in a picture image, etc.). Neural networks are then used to process each of the regions (e.g., one neural network operating on each region). The neural networks share information using prolongation and restriction operations. Prolongation operations propagate activations from a neural network operating on a lower resolution region onto context zones of a neural network operating on a higher resolution region. Restriction operations propagate activations from the neural network operating on the higher resolution region back to the neural network operating on the lower resolution region. The operations described herein can be performed when training the neural networks and/or when running the neural networks to perform computer vision tasks.

For example, performing adaptive high-resolution digital image processing using neural networks can comprise receiving a digital image and decomposing the digital image into a plurality of regions. The regions can comprise a first region that covers the entire digital image with a first resolution (which is a lower resolution than the original resolution of the digital image). The regions can comprise one or more additional regions that cover less than the entire area of the digital image and that are contained within the first region (e.g., that overlap the first region). The one or more additional regions also have one or more additional resolutions that are higher than the first region. Neural networks (e.g., convolutional neural networks) process the regions. For example, a first neural network operates on the first region and at least a second neural network operates on the one or more additional regions. The neural network operations comprise prolongation operations that propagate activations from the first neural network onto context zones of the second neural network, where a context zone for a given region is outside of the given region. The neural network operations also comprise restriction operations that propagate activations from the second neural network back to the first neural network. Results of the image processing can be output. For example, the neural networks can be output (e.g., as trained neural networks). Other results of the processing can include image classification results (e.g., using outputs of the neural networks to perform computer vision tasks).

Using the technologies described herein, any type of digital image can be processed. For example, the digital image can be a computer-generated image of a document (e.g., an invoice, purchase order, etc.). The digital image can be an image captured of a real-world object, such as a picture or frame of video taken with a digital camera. The digital image can be a medical imaging image (e.g., a digital image representing an x-ray, MRI, CT, or other type of medical imaging image). The technologies are generally described in the context of a 2-dimensional image, but they are applicable to 3-dimensional (and in general N-dimensional) data as well. The technologies can also be applied to 1-dimensional audio signal processing.

The technologies described herein preserve the context information (also referred to as the semantic structure) of the digital image. For example, different regions of the digital image may be related (e.g., different regions of an invoice), and if the context information is not preserved during processing then it can be lost (e.g., resulting in degraded performance). For example, if an invoice has a region containing total amounts (e.g., in the lower right-hand corner of the image), and if this region is extracted without preserving its positional context within the entire image, then the positional context will be lost. Loss of context information can negatively affect processing of digital images using neural networks (e.g., for computer vision tasks, such as image classification, object detection, etc.). For example, the neural networks may not be able to accurately identify or classify (or accuracy may be degraded) different regions (e.g., containing different features) of the digital image. For example, if a total amounts region of a digital invoice image is processed by neural networks without its associated context information, then the neural networks may not be able to accurately classify (or classify with reduced confidence) the region as a total amounts region of the invoice. For example, it may be difficult or impossible to distinguish between an invoice document and a purchase order document if the spatial context information is lost.

Some computer vision tasks may require much higher image resolutions because the features in the images may be relatively small. For instance, consider the task of classifying documents, such as an invoices, based on digital document images. The classification result may depend on the text as well as the layout of the document. Any text on the document may be fairly small compared to the document size. This means that the document image must be processed with sufficiently high resolution such that the document text is still resolved. In contrast, some regions on the document image may not contain any useful features for the task at hand. For instance, document images of invoices may contain empty regions and/or white space without any text. These regions may not need to be processed with high resolution. Potentially, a lot of computing resources are wasted on irrelevant regions of an input document image. Even worse, those regions that require high image resolution may not fit into memory since it is taken up by irrelevant regions (e.g., empty regions).

The technologies described herein provide advantages over typical solutions (e.g., solutions which process a digital image at a single resolution). For example, digital images can be processed more efficiently (e.g., using fewer computing resources, such as memory and processor resources) by processing some regions with relatively lower resolution (e.g., regions with less interesting content) and other regions with relatively higher resolution (e.g., regions with more interesting content). Accuracy of processing results using neural networks (e.g., convolutional neural networks) can also be improved. For example, more important data (e.g., digital image data) can be processed at a higher resolution resulting in increased accuracy (e.g., image classification accuracy). Furthermore, various regions of the digital image can be processed without losing context information. For example, using prolongation and/or restriction operations can convey context information (e.g., activation information) from neural networks operating on relatively lower resolution regions to neural networks operating on relatively higher resolution regions (e.g., onto context zones) and back again.

In general, the technologies described herein can provide one or more of the following advantages. Computational efficiency of deep neural networks (e.g., convolutional neural networks) can be improved by focusing on relevant regions on the image without compromising on the accuracy. Processing can be performed using neural networks for much larger images with higher resolution because irrelevant regions of the image are processed with lower resolution. Information flow can be facilitated between multiple spatial scales (e.g., grids of different resolutions in different regions of the image) and across long distances of the image, thus improving accuracy.

Decomposition of Digital Images

In the technologies described herein, digital images are decomposed into several overlapping regions of different resolutions (also referred to as a region hierarchy). The term "resolution" as used herein refers to the pixel density, which can be in terms of pixels-per-inch (PPI) or some other measure of pixel density. Therefore, a region with a lower resolution will have a lower pixel density measure than a region with a higher resolution. The overlapping regions comprise a first region that covers the entire digital image. The first region has the lowest resolution. For example, if the digital image has a native resolution of 1,000 by 1,000 pixels, then the first region will have a lower resolution (e.g., 50 by 50 pixels). In other words, the first region will have a lower PPI value than the original PPI of the digital image (e.g., if the original resolution is 200 PPI, then the first region would be 10 PPI). The pixel values of the first region can be calculated from the original pixel values (at the original, higher, resolution) in a variety of ways (e.g., common down-sampling techniques can be used to create a reduced spatial resolution version of the digital image).

The resolution of the first region can be a pre-determined resolution (e.g., a user-configured value or ratio based on the native resolution) or a dynamically determined resolution (e.g., determined dynamically based on the content of the digital image).

The overlapping regions also comprise (in addition to the first region) one or more additional regions at one or more higher resolutions than the first region. Also, the one or more additional regions cover less than the entire digital image. Because the one or more additional regions cover less than the entire digital image, their "resolutions" refer to their pixel density (e.g., the number of pixels per unit of length or area). In this way, a higher resolution region may or may not have more total pixels than a lower resolution region (this depends on the size of each region, where the size is the amount of area of the digital image covered by the region), but the higher resolution region will have a higher PPI value than the lower resolution region.

For example, the one or more additional regions at the one or more higher resolutions than the first region can comprise one or more medium resolution regions (e.g., if the first region has a resolution equivalent to 10 PPI then the one or more medium resolution regions can have a resolution equivalent to 20 PPI) and one or more high resolution regions (e.g., if the one or more medium resolution regions have a resolution equivalent to 20 PPI then the one or more high resolution regions can have a resolution equivalent to 40 PPI). In this example, there are three levels of resolution regions, the first region with a first (lowest) resolution, one or more regions with a second resolution (higher than the resolution of the first region), and one or more regions with a third resolution (higher than the resolution of the one or more regions having the second resolution). In general, there can be any number of regions at each of any number of resolutions.

The resolutions of the various regions can be pre-determined resolutions (e.g., user-configured values or ratios based on the original resolution) or dynamically determined resolutions (e.g., determined dynamically based on the content of the digital image). In some implementations, the additional resolutions (other than the resolution of the first region) are determined as a ratio (e.g., a 1:2 ratio where the second resolution is twice the first resolution and the third resolution is twice the second resolution). In some implementations, the highest resolution is the original resolution of the digital image. For example, if the digital image is a 1,000 by 1,000 image with 200 PPI, then the highest resolution would be 200 PPI.

Regions are organized in an overlapping, or "nested," arrangement, which is also called a region hierarchy. Specifically, the first region covers the entire digital image. Regions of the second resolution (higher than the resolution of the first region) are contained within, and are overlaid on top of, the first region, regions of the third resolution (higher than the second resolution) are contained within, and are overlaid on top of, regions of the second resolution, and so on. Also, regions of a given resolution do not overlap each other.

The resolution of a given region can also be described as a pixel grid (also referred to as a grid). The pixel grid can be used to visually depict the resolution and PPI of a given region (e.g., with each grid block or "patch" corresponding to a pixel). For example, a 10 by 10 grid can represent a 10 by 10 pixel version of the digital image.

In some implementations, the digital image (e.g., which initially has an original resolution) is decomposed into several rectangular nested regions with different resolutions. For example, regions of an invoice image that contains small text are processed with high resolution, regions with large text are processed with medium resolution, and regions without any text are processed at low resolution.

FIG. 1 is a diagram depicting an example decomposition 100 of a digital image into overlapping regions of different resolution. The digital image 110 is an image of an example invoice.

In the example decomposition 100, the digital image 110 is decomposed into a number of regions. Specifically, there is a first region covered by a coarse grid 120. The coarse grid 120 covers the entire digital image 110. The coarse grid 120 has a relatively low resolution (a lower resolution than the other regions and a lower resolution than the original resolution of the digital image). The low PPI of the coarse grid 120 is visually depicted by the large grid blocks.

As depicted in the example decomposition 100, there are a number of additional regions that overlap the coarse grid 120. Specifically, there are three regions covered by three corresponding medium grids 130. The three medium grids 130 cover more interesting regions of the digital image 110 (e.g., regions containing larger text, headings, and/or structure that are more interesting than the blank areas of the digital image 110). The three medium grids 130 have a higher resolution (a higher PPI value) than the coarse grid 120. For example, if the coarse grid 120 has a PPI value of 20, then the three medium grids 130 could have a PPI value of 50.

As depicted in the example decomposition 100, there are a number of additional regions that overlap the coarse grid 120 and the medium grids 130. Specifically, there are four regions covered by four corresponding fine grids 140. The four fine grids 140 cover more interesting regions of the digital image 110 (e.g., regions containing smaller text and/or numerical values that are more interesting than the blank areas or the larger text areas of the digital image 110). The four medium grids 140 have a higher resolution (a higher PPI value) than the medium grids 130. For example, if the medium grids 130 have a PPI value of 50, then the four fine grids 140 could have a PPI value of 100 (e.g., which could be the original PPI of the digital image 110).

In general, the digital image can be decomposed into any number of regions having varying resolutions (e.g., varying PPIs). Furthermore, a given region does not have to overlay a region of the next lower resolution. For example, a fine grid region could directly overlay a coarse grid region, without a medium grid in-between.

Neural Network Operations

In the technologies described herein, neural networks are used to process digital images that have been decomposed into several overlapping regions of different resolutions. For example, neural networks (e.g., deep neural networks such as convolutional neural networks (CNNs)) can be trained and run using the technologies described herein.

In some implementations, a neural network (having one or more layers) is executed on region. In general, there can be one neural network with distinct weights per resolution serving all regions of the same resolution. Furthermore, if the spatial scales are self-similar, there may be just one neural network that serves all resolutions and all regions.

In the technologies described herein, information is exchanged between neural networks operating on regions of different resolution (e.g., between a neural network operating on a region with a lower resolution and a neural network operating on region with a higher resolution). In order to ensure this flow of information between the different resolution regions, new operations are introduced. The first new operation is a prolongation operation, which conveys information from a layer of a neural network operating at a first resolution onto context zones of a layer of a neural network operating at a second, finer, resolution (which is a higher PPI region). In some implementations, the prolongation operation is implemented via interpolation. The prolongation operation ensures that the context which the neural network captures on the first resolution region can propagate to the neural network processing the second, finer, resolution region which covers a smaller region compared to the first resolution region and thus is missing that context.

Similarly, the neural network operating at the first resolution can benefit from the information generated by the neural network operating at the second, finer, resolution. Therefore, the second new operation, which is called a restriction operation, copies or down-samples the activations of the neural network operating at the second resolution back onto the activations of the neural network operating at the first resolution.

In some implementations, the neural networks are processed using the following algorithm. First, the context zones of the region covered by the fine grid are filled in via prolongation operations from the first layer of the neural network operating on the region covered by the coarse grid.

Second, the activations of the first layer of the neural network operating on the coarse grid are computed. For instances, this could be a convolutional layer with weights $W_{coarse}$ coarse and batch normalization and ReLU nonlinearity.

Third, the activations of the first layer of the neural network operating on the fine grid are computed. For instances, this could be a convolutional layer with weights $W_{fine}$ and batch normalization and ReLU nonlinearity. Note that the convolutional layer can only be computed on the nominal grid, e.g., zero padding is not allowed (this would destroy the context information from the coarse grid). The context zones must contain sufficiently many grid points such that the convolutional operation does not require any padding. It is possible that multiple layers in the neural network operating on the file grid are computed before proceeding to the following (fourth) step. The context zones must then be enlarged by the number of layers times half the convolutional kernel width in order to avoid using any padding and to self-consistently incorporate context information from the coarse grid region.

Fourth, after n layers have been computed in the neural network operating on the fine grid, the n-th layer output is restricted, using the restriction operation, onto the layer output of the neural network operating on the coarse grid (e.g., the same layer from which activations were prolongated in the first step). In some implementations, restriction operation conveys the activations back to the next layer of the neural network operating on the coarse grid, but before activations are computed for the next layer, which achieves the same result.

Fifth, the steps are repeated for the next layer of the neural network operating on the coarse grid and the next layer(s) of the neural network operating on the fine grid.

In order to ensure the information flow between the different neural networks, the prolongation/restriction operations are performed first and only then are the forward passes of the neural networks performed. In this way, the processing of each neural network is "context-aware" and is directly influenced by the calculations of the different neural networks.

Depending on how many regions and resolutions are present for the digital image, the algorithm can be carried out for each combination of nested regions. For example, with regard to FIG. 1, the algorithm can be performed to convey information between the neural network operating on the coarse grid 120 and the three neural networks operating on the three coarse grids 130, and between the three neural networks operating on the three coarse grids 130 and the four neural networks operating on the three fine grids 140.

Figure 2:
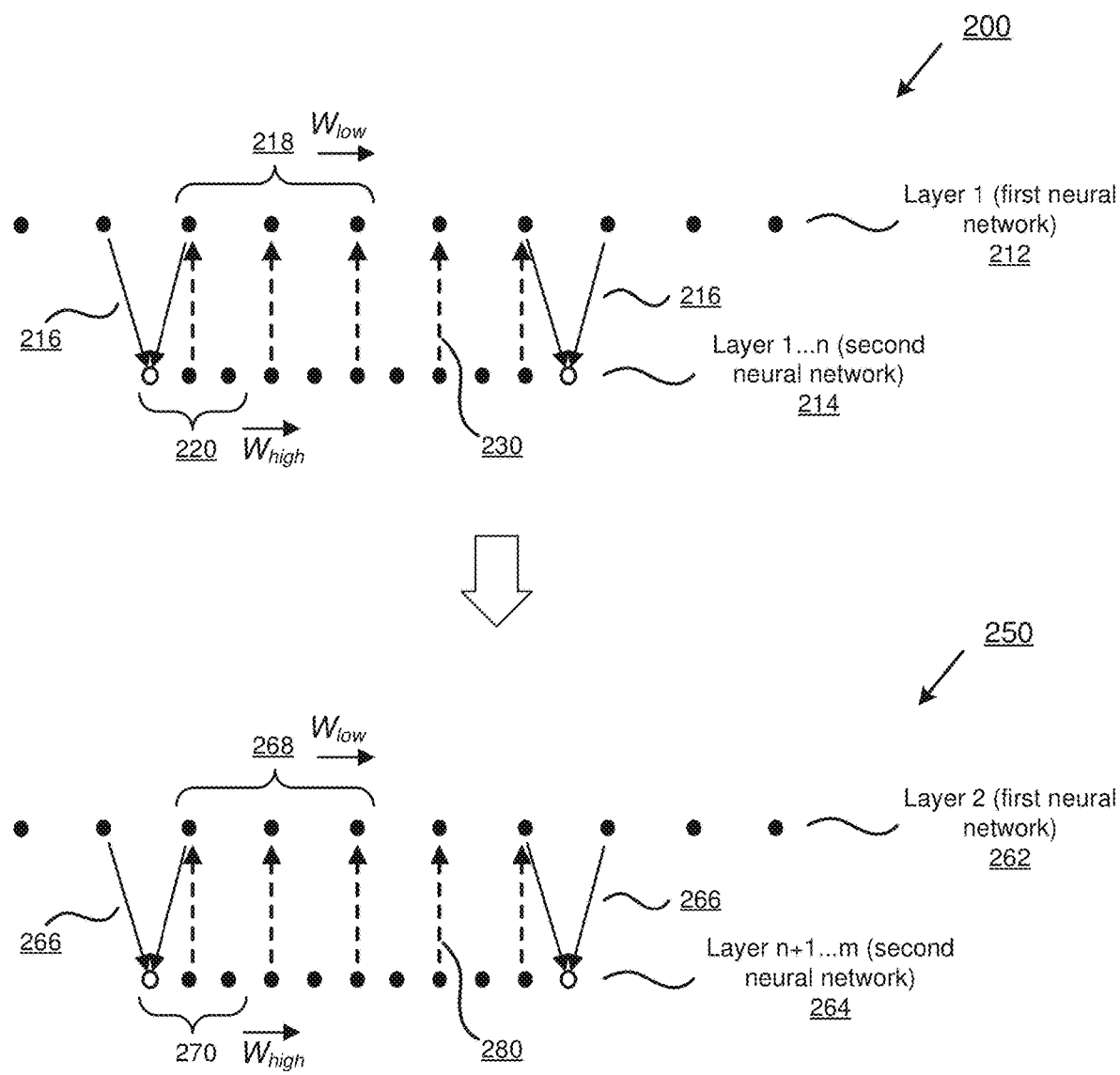
FIG. 2 is a diagram depicting example prolongation and restriction operations performed on neural networks processing different regions with different resolutions.

FIG. 2 is a diagram depicting example prolongation and restriction operations 200 performed on neural networks processing different regions with different resolutions. Specifically, the example prolongation and restriction operations 200 are illustrated using a one-dimensional representation of two interacting neural networks.

The first neural network is operating in a region with a lower resolution, and the first neural network has two layers. The second neural network is operating in a region with a resolution higher than the first neural network, and the second neural network has one or more layers for each layer of the first neural network. For example, the first neural network could be operating on the region covered by the coarse grid 120 and the second neural network could be operating on one of the regions covered by one of the medium grids 130, or the first neural network could be operating on one of the regions covered by one of the medium grids 130 and the second neural network could be operating on one of the regions covered by one of the fine grids 140 (in this situation, it would be one of the medium grid regions, such as 150, and one if its nested fine grid regions, such as 152).

In the top section of the diagram 200, prolongation and restriction operations are illustrated between a first layer of the first neural network 212 and one or more layers of the second neural network 214. The filled-in black dots represent activations of the respective neural network. As depicted, the top row of filled-in black dots are activations of the first layer of the first neural network 212. Similarly, the bottom row of filled-in black dots are activations of the one or more layers of the second neural network 214. In some implementations, the input to the layers of the first and/or second neural networks is the pixel values of their respective regions (e.g., the initial weights of the first layer of the first neural network 212 are set to the pixel values of the region being processed by the first neural network). As depicted, the region operated on by the first neural network has a lower pixel density, and therefore the activations are spaced further apart (to illustrate the lower pixel density) than those of the region operated on by the second neural network.

As depicted at 216, the prolongation operations are carried out first. Specifically, in this example, the prolongation operations are performed by interpolating the indicated activations (the solid-line arrows) of the first layer of the first neural network 212 onto context zones (represented by the empty circles) of a first layer of the second neural network 214. In some implementations, the activations of the first layer of the first neural network 212 are the pixel values of the region being processed by the first neural network if this is the first iteration of this process. But, on subsequent iterations, the activations are taken from the activations calculated in the previous iteration. As depicted, there are two activations that are interpolated onto one context zone activation. However, in general, a given context zone activation can be calculated from a different number of activations (e.g., which can depend on the pixel density of the regions).

In this way, the prolongation operations convey information (from the activations) from the first layer of the first neural network 212 to the first layer of the second neural network 214 at the boundary of the region being operated on by the second neural network. With the simplified one-dimensional representation (that is used for ease of illustration), the context zone (or boundary area) is depicted as the two empty circles on the left and right ends (the circles are empty because there are no corresponding pixel values as the context zone is outside the rectangular area of pixels of the region covered by the second neural network). However, in a two-dimensional representation, as would be the case with a two-dimensional digital image, the second neural network would be processing a rectangular region, and thus would have a context zone around the border of the rectangular region (i.e., just outside the top, right, bottom, and left edges of the region). The context zone for a given region is outside the border (e.g., outside the rectangular area) of the given region. For example, if a given region covers a grid of pixel values, then the context zone can represent a surround 1-pixel wide area. The regions are generally described as rectangular regions, but the technologies can be applied using regions of different shapes.

Next, the activations are calculated for the first layer of the first neural network 212, as depicted at 218. For example, the activations can be calculated by applying a convolutional layer. The activations are calculated using the weights of the first neural network ($W_{low}$), which could be weights of a convolutional kernel of the convolutional neural network.

Next, activations are calculated for the first layer, and possibly one or more additional layers ("n" can be one or more), of the second neural network 214, as depicted at 220. Calculating these activations includes using the activations that were conveyed from the first layer of the first neural network 212 to fill in the empty circles of the context zone (e.g., interpolated from the activations of the first neural network). For example, the activations can be calculated by applying one or more convolutional layers. The activations can be calculated using the weights of the second neural network ($W_{high}$), which could be weights of a convolutional kernel of the convolutional neural network.

Finally, restriction operations are performed in which the activations from the final layer of the one or more layers of the second neural network 214 are conveyed (e.g., copied or interpolated) back onto the activations of the first layer of the first neural network 212. The restriction operations are depicted as the dashed line arrows (one of the restriction operations is indicated at 230).

In some implementations, the depicted layers are convolutional layers. For example, the first layer of the first neural network 212 is a convolutional layer, and the one or more layers of the second neural network 214 are convolutional layers.

After the restriction operations are completed, the computation of the first layer of the first neural network 212, and the one or more layers of the second neural network 214, are complete. Depending on how many layers the first and second neural networks have, the process could be complete at this stage, or the process could continue to compute additional layers by performing additional iterations of this process. In this example, the first neural network has two layers, so the process continues to the bottom section of the diagram 250 to compute the second layer of the first neural network (and the corresponding one or more additional layers of the second neural network).

In the bottom section of the diagram 250, prolongation and restriction operations are illustrated between the second layer of the first neural network 262 and one or more additional layers (n+1 to m) of the second neural network 264. Operations that correspond to those depicted in the top section of the diagram 200 are then performed. Specifically, prolongation operations are performed as depicted at 266 (similarly to those performed at 216). But, in this case, the activations of the second layer of the first neural network 262 are the activations from the first layer of the first neural network 212 at the end of the first iteration. Next, the activations are calculated for the second layer for the first neural network 262, as depicted at 268 (similar to the calculations depicted at 218). Next, activations are calculated for the one or more additional layers of the second neural network 264, as depicted at 270 (similar to the calculations depicted at 220). Finally, restriction operations are performed in which the activations from the final layer of the one or more additional layers of the second neural network 264 are conveyed (e.g., copied or interpolated) back onto the activations of the second layer of the first neural network 262, which are the dashed line arrows (one of these restriction operations is depicted at 280).

In some implementations, the depicted layers are convolutional layers. For example, the second layer of the first neural network 262 is a convolutional layer, and the one or more additional layers of the second neural network 264 are convolutional layers. The first and second neural networks can also comprise additional layers (e.g., pooling layers, ReLU layers, and/or fully connected layers).

Using the prolongation operations (e.g., as illustrated in FIG. 2), context information (e.g., semantic information) can be conveyed from neural networks operating on regions with lower resolution (coarser grids) to neural networks operating on regions with higher resolution (finer grids). In addition, using restriction operations (e.g., also illustrated in FIG. 2), information calculated from the neural networks operating on regions with higher resolution can propagate back up to neural networks operating on regions with lower resolution (e.g., improving the results of the neural networks operating at lower resolution and/or allowing information to be conveyed between regions which are connected by the region operating at the lowest resolution and which covers the entire digital image).

Figure 3:
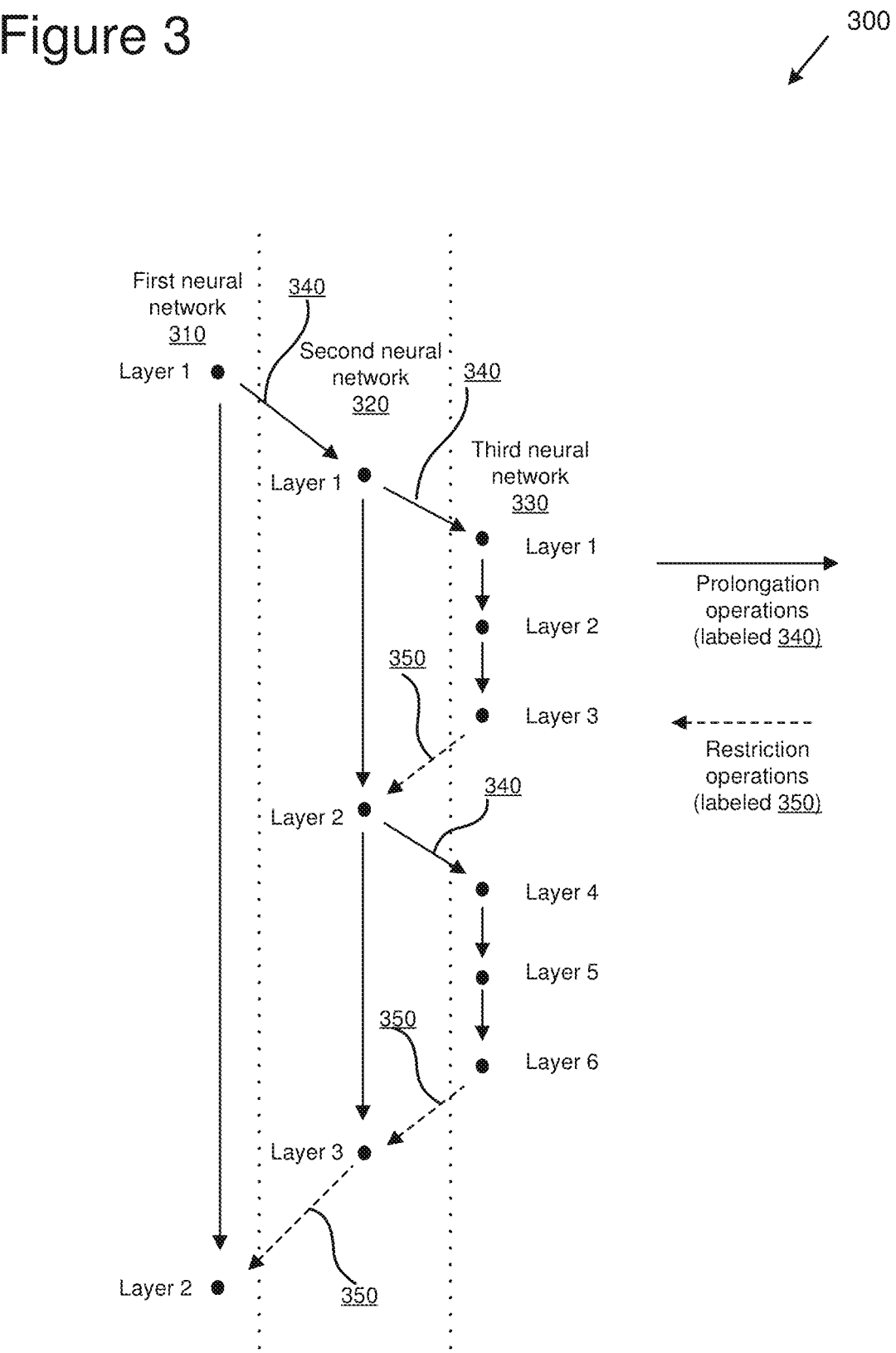
FIG. 3 is a diagram depicting prolongation and restriction operations performed on three neural networks processing three corresponding regions.

FIG. 3 is a diagram 300 depicting prolongation and restriction operations performed on three neural networks processing three corresponding regions. The first neural network 310 has two layers and is operating on a first region with lower resolution that covers the entire digital image. For example, the first neural network 310 could be operating on the region covered by the coarse grid 120. The second neural network 320 has three layers and is operating on a second region of the digital image contained within the first region that has a higher resolution than the first region. For example, the second neural network 320 could be operating on region 150. The third neural network 330 has six layers and is operating on a third region of the digital image contained within the second region that has a higher resolution than the second region. For example, the third neural network 330 could be operating on region 152.

In the diagram 300, each of the three neural networks is depicted in a separate column. In general, the diagram 300 expands on how the different neural networks interact using the prolongation and restriction operations depicted in FIG. 2. Specifically, the prolongation operations are depicted in the diagram 300 at 340 (the solid arrows form left to right). The prolongation operations convey information from activations (e.g., using interpolation) from a layer of one neural network to a layer of another neural network operating at a higher resolution. For example, prolongation operations are performed from layer 1 of the first neural network 310 to layer 1 of the second neural network 320, and from layer 1 of the second neural network 320 to layer 1 of the third neural network 330.

The restriction operations are depicted in the diagram 300 at 350 (the dashed line arrows from right to left). The restriction operations convey activations from a layer of one neural network back to a layer of another neural network operating at a lower resolution. For example, the restriction operations are performed from layer 3 of the third neural network 330 to layer 2 of the second neural network 320. However, the activations of layer 2 of the first neural network 310 can only be calculated once the restriction operation has been performed (coming from layer 3 of the second neural network 320).

The number of layers of each neural network depicted in FIG. 3 is for illustration purposes. In general, each neural network can have any number of layers.

So far, information flow has been described on a fixed hierarchy of regions. For example, in FIG. 3, for each layer of the second neural network 320, there are three layers in the third neural network 330. Similarly, for each layer in the first neural network 310, there are three layers in the second neural network 320. In some implementations, an adaptive arrangement can be used instead of this fixed hierarchy arrangement. The adaptive arrangement can comprise collapsing regions (e.g., collapsing high resolution regions that may not be necessary because they would not significantly improve results). For example, if additional location context information would not be helpful at high resolution, then the layer 4, 5, and 6 processing of the third neural network 330 can be skipped. The adaptive arrangement can also comprise creating layers of a neural network (e.g., a special type of local up-sampling). For example, if only two neural networks are operating, and additional context information is needed, then one or neural networks can be activated to operate on one or more finer regions.

In order to establish a hierarchy of regions for a given digital image, there are a number of approaches. One approach is to predefine the region hierarchy (e.g., location and arrangement of the regions) regardless of the digital image (e.g., regardless of the content of the digital image). For example, this may be used in situations where the digital image content is similar (e.g., has a similar spatially located feature frequency distribution). Another approach is to dynamically determine the region hierarchy based on the digital image content. In some implementations, this approach of dynamically determining the region hierarchy is performed automatically as a pre-processing step. For example, the pre-processing of the digital image can be performed using image processing techniques and/or by using a separate neural network that predicts the regions and their resolutions. For example, the local spatial frequency content can be calculated as a function of (x, y) coordinates (e.g., via a spectrogram). Based on certain frequency thresholds, regions and resolutions can be determined for decomposing the digital image. The higher the local frequency content, the higher the region's resolution. Other approaches could compute local smoothness by computing derivatives up to a certain order N (or directly using, e.g., the Sobolev norm). The lower the local smoothness, the more local resolution and thus refinement is necessary. For document images, the region hierarchy can be determined based on the distribution of word boxes (e.g., as obtained from a separate OCR step).

Methods for Adaptive High-Resolution Digital Image Processing using Neural Networks In the technologies described herein, methods can be provided for adaptive high-resolution digital image processing using neural networks. For example, hardware and/or software elements can perform operations to automatically process digital images using neural networks that operate on various regions and resolutions, and that use prolongation and restriction operations to convey information between the neural networks operating on the various regions.

Figure 4:
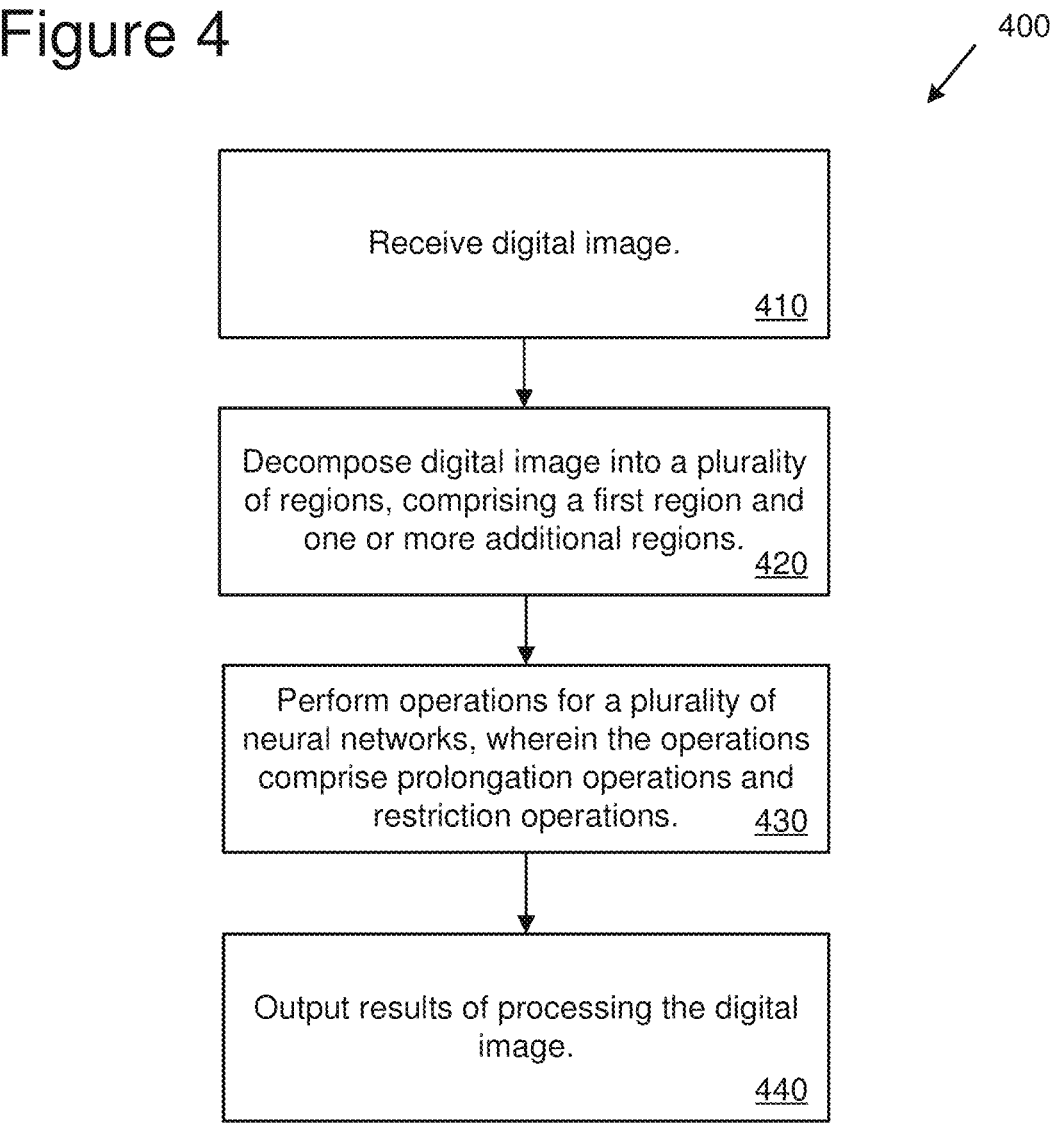
FIG. 4 is a flowchart of an example process for adaptive high-resolution digital image processing using neural networks.

FIG. 4 is a flowchart depicting an example process 400 for adaptive high-resolution digital image processing using neural networks. At 410, a digital image is received. For example, the digital image can be obtained from a file or from an imaging device (e.g., a digital camera or medical imaging device).

At 420, the digital image is decomposed into a plurality of regions (e.g., in a region hierarchy). The plurality of regions comprise a first region and one or more additional regions. The first region covers the entire area of the digital image and has a first resolution which is a lower resolution representation of the digital image (lower than the original resolution of the digital image). The one or more additional regions cover less than the entire area of the digital image and are contained within the first region. The one or more additional regions have one or more additional resolutions that are higher than the first region. For example, the plurality of regions can be arranged into a region hierarchy that defines the arrangement of regions (e.g., the location of regions within the digital image, which indicates which regions are contained within other regions) and their respective resolutions.

At 430, operations are performed for a plurality of neural networks. The plurality of neural networks comprise a first neural network operating on the first region and at least a second neural network operating on the one or more additional regions (e.g. one neural network per region). The operations comprise prolongation operations that propagate activations from the first neural network onto context zones of the second neural network, where a context zone for a given region is outside of the given region. The operations also comprise restriction operations that propagate activations from the second neural network back to the first neural network.

At 440, results of processing the digital image are output. For example, the results can comprise results of a computer vision task (e.g., an image classification result). The results can also comprise one or more of the plurality of neural networks (e.g., trained neural networks can be output).

Figure 5:
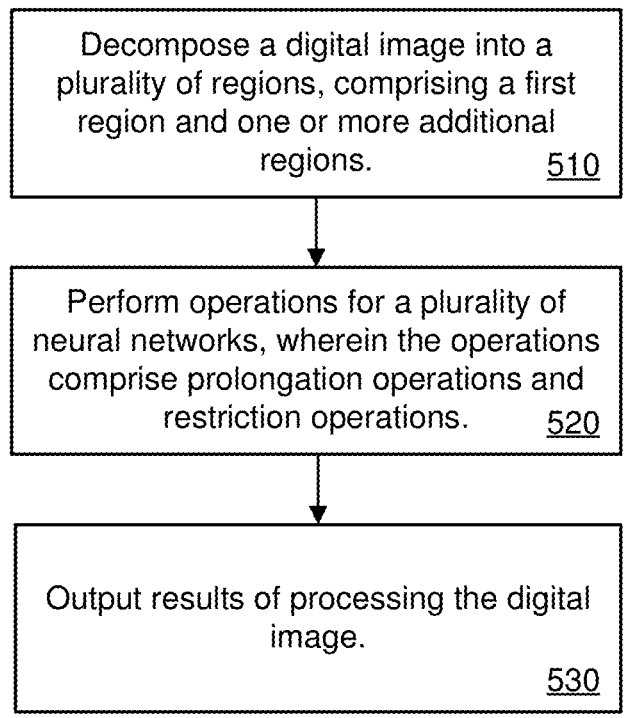
FIG. 5 is a flowchart of an example process for adaptive high-resolution digital image processing using neural networks.

FIG. 5 is a flowchart depicting an example process 500 for adaptive high-resolution digital image processing using neural networks. At 510, the digital image is decomposed into a plurality of regions (e.g., in a region hierarchy). The plurality of regions comprise a first region and one or more additional regions. The first region covers the entire area of the digital image and has a first resolution which is a lower resolution representation of the digital image (lower than the original resolution of the digital image). The one or more additional regions cover less than the entire area of the digital image and are contained within the first region. The one or more additional regions have one or more additional resolutions that are higher than the first region. For example, the plurality of regions can be arranged into a region hierarchy that defines the arrangement of regions (e.g., the location of regions within the digital image, which indicates which regions are contained within other regions) and their respective resolutions.

At 520, operations are performed for a plurality of neural networks. The plurality of neural networks comprise a first neural network operating on the first region and at least a second neural network operating on the one or more additional regions (e.g. one neural network per region). The operations comprise, for a first layer of the first neural network and one or more layers of the second neural network, performing prolongation operations to propagate activations from the first layer of the first neural network onto context zones of a first layer of the second neural network. The operations also comprise performing restriction operations to propagate activations from a final layer of one or more layers of the second neural network back to the first layer of the first neural network. The operations can further comprise prolongation and restriction operations for additional layers of the plurality of neural networks.

At 530, results of processing the digital image are output. For example, the results can comprise results of a computer vision task (e.g., an image classification result). The results can also comprise one or more of the plurality of neural networks (e.g., trained neural networks can be output).

Computing Systems

Figure 6:
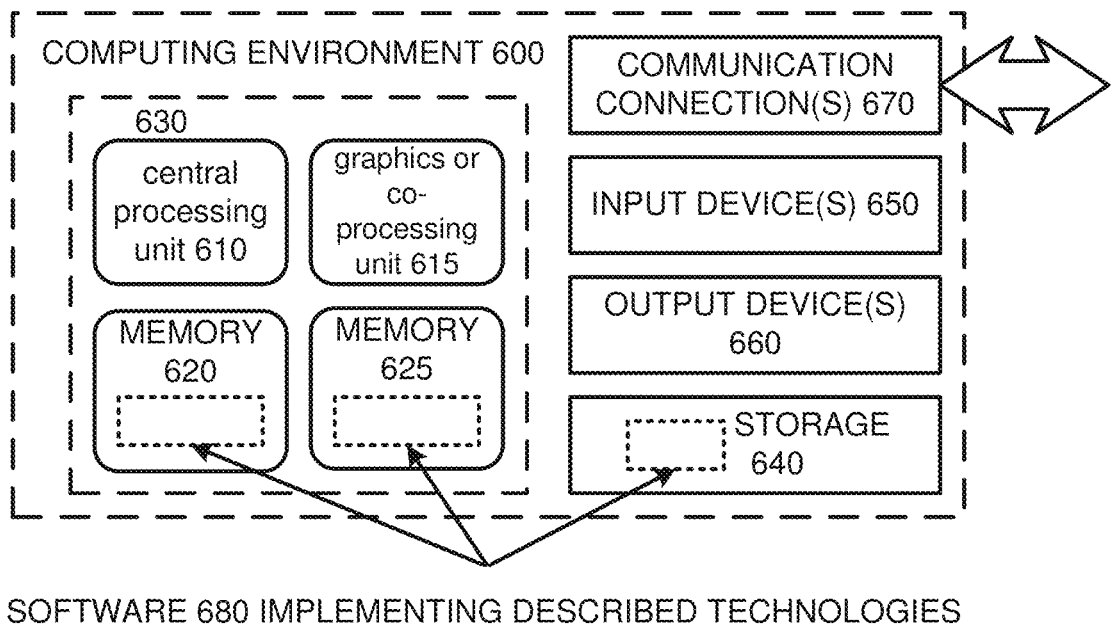
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 7:
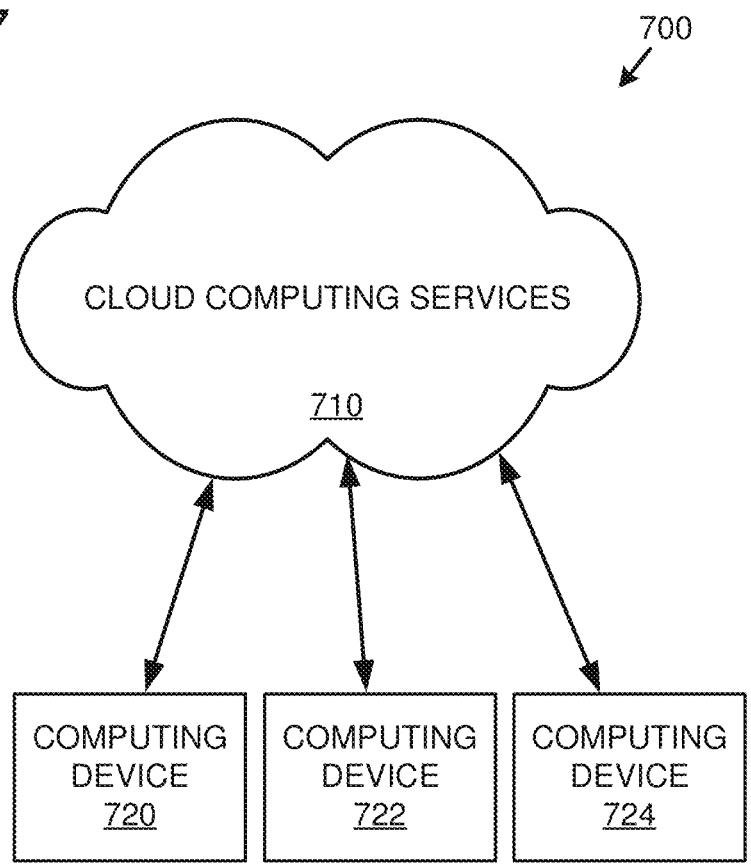
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for adaptive high-resolution digital image processing using neural networks, the method comprising:
   receiving a digital image;
   decomposing the digital image into a plurality of regions, wherein the plurality of regions comprise:
      a first region that covers an entire area of the digital image, wherein the first region has a first resolution, and wherein the first resolution is a lower resolution representation of the digital image; and
      one or more additional regions that cover less than the entire area of the digital image and that are contained within the first region, wherein the one or more additional regions have one or more additional resolutions that are higher than the first resolution;
   performing operations for a plurality of neural networks, wherein the plurality of neural networks comprise a first neural network operating on the first region and at least a second neural network operating on the one the one or more additional regions, comprising:
      performing prolongation operations that propagate activations from the first neural network onto context zones of the second neural network, wherein a context zone for a given region is outside of the given region; and
      performing restriction operations that propagate activations from the second neural network back to the first neural network; and
   outputting results of processing the digital image.

2. The method of claim 1, wherein the prolongation operations comprises:

propagating activations from a first layer of the first neural network onto context zones of a first layer of the second neural network.

3. The method of claim 1, wherein the prolongation operations comprise:
for each activation of the context zones, interpolating a plurality of activations of a layer of the first neural network to calculate the activation of the context zones of a layer of the second neural network.

4. The method of claim 1,
wherein the prolongation operations comprises:
propagating activations from a first layer of the first neural network onto context zones of a first layer of the second neural network; and
wherein the restriction operations comprises:
propagating activations from a final layer of one or more layers of the second neural network back to the first layer of the first neural network.

5. The method of claim 1, wherein the one or more additional regions are a plurality of additional regions, and wherein the first region conveys context information received from the restriction operations between the plurality of additional regions.

6. The method of claim 1, further comprising:
performing a computer vision task using the plurality of neural networks.

7. The method of claim 1, further comprising:
outputting an image classification result for the digital image.

8. The method of claim 1, decomposing the digital image into a plurality of regions comprises:
pre-processing the digital image to dynamically determine a region hierarchy, wherein the region hierarchy defines the plurality of regions including region location and resolution.

9. The method of claim 1, wherein the method is performed to train the plurality of neural networks, and wherein the outputting comprises outputting the trained plurality of neural networks.

10. The method of claim 1, wherein the one or more additional regions are a plurality of additional regions having two or more additional resolutions, and wherein one or more of the additional regions are nested within one another.

11. The method of claim 1, wherein the first neural network and the second neural network are convolutional neural networks.

12. One or more computing devices comprising:
processors; and
memory;
the one or more computing devices configured, via computer-executable instructions, to perform operations for adaptive high-resolution digital image processing using neural networks, the operations comprising:
receiving a digital image;
decomposing the digital image into a plurality of regions, wherein the plurality of regions comprise:
a first region that covers an entire area of the digital image, wherein the first region has a first resolution, and wherein the first resolution is a lower resolution representation of the digital image; and
one or more additional regions that cover less than the entire area of the digital image and that are contained within the first region, wherein the one or more additional regions have one or more additional resolutions that are higher than the first resolution;
performing operations for a plurality of neural networks, wherein the plurality of neural networks comprise a first neural network operating on the first region and at least a second neural network operating on the one the one or more additional regions, comprising:
performing prolongation operations that propagate activations from the first neural network onto context zones of the second neural network, wherein a context zone for a given region is outside of the given region; and
performing restriction operations that propagate activations from the second neural network back to the first neural network; and
outputting results of processing the digital image.

13. The one or more computing devices of claim 12, wherein the prolongation operations comprise:
propagating activations from a first layer of the first neural network onto context zones of a first layer of the second neural network.

14. The one or more computing devices of claim 12, wherein the prolongation operations comprise:
for each activation of the context zones, interpolating a plurality of activations of a layer of the first neural network to calculate the activation of the context zones of a layer of the second neural network.

15. The one or more computing devices of claim 12,
wherein the prolongation operations comprises:
propagating activations from a first layer of the first neural network onto context zones of a first layer of the second neural network; and
wherein the restriction operations comprises:
propagating activations from a final layer of one or more layers of the second neural network back to the first layer of the first neural network.

16. The one or more computing devices of claim 12, wherein the one or more additional regions are a plurality of additional regions, and wherein the first region conveys context information received from the restriction operations between the plurality of additional regions, and wherein at least two of the plurality of additional regions do not overlap each other.

17. One or more computer-readable storage media storing computer-executable instructions for execution on one or more computing devices to perform operations for adaptive high-resolution digital image processing using neural networks, the operations comprising:
decomposing a digital image into a plurality of regions, wherein the plurality of regions comprise:
a first region that covers an entire area of the digital image, wherein the first region has a first resolution, and wherein the first resolution is a lower resolution representation of the digital image;
one or more additional regions that cover less than the entire area of the digital image and that are contained within the first region, wherein the one or more additional regions have one or more additional resolutions that are higher than the first resolution;
performing operations for a plurality of neural networks, wherein the plurality of neural networks comprise a first neural network operating on the first region and at least a second neural network operating on the one the one or more additional regions, comprising:
for a first layer of the first neural network and one or more layers of the second neural network:
performing prolongation operations to propagate activations from the first layer of the first neural network onto context zones of a first layer of the second neural network; and performing restriction operations to propagate activations from a final layer of one or more layers of the second neural network back to the first layer of the first neural network; and outputting results of processing the digital image.

18. The one or more computer-readable storage media of claim 17, wherein the one or more additional regions are a plurality of additional regions, and wherein the first region conveys context information received from the restriction operations between the plurality of additional regions.

19. The one or more computer-readable storage media of claim 17, wherein the operations are performed to train the plurality of neural networks to perform computer vision tasks from input digital images.

20. The one or more computer-readable storage media of claim 17, wherein the first neural network and the second neural network are convolutional neural networks.

* * * * *